No. 756,086. PATENTED MAR. 29, 1904.
J. J. WEILER.
INDEPENDENTLY ROTATING WHEEL.
APPLICATION FILED NOV. 7, 1902.
NO MODEL.
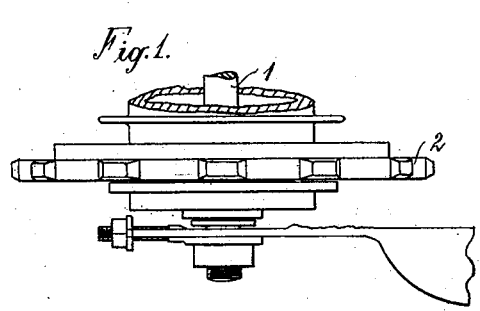
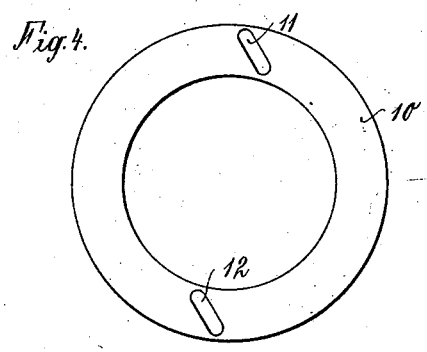
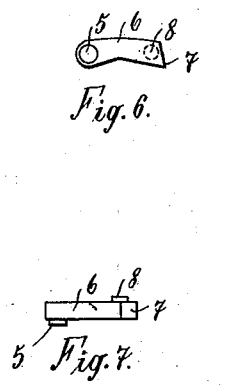
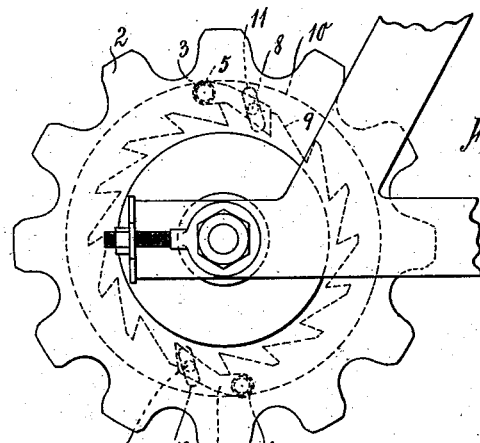
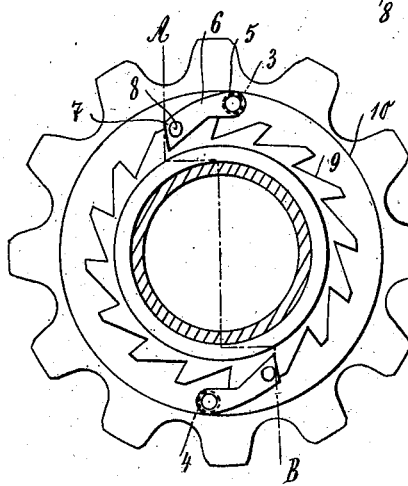
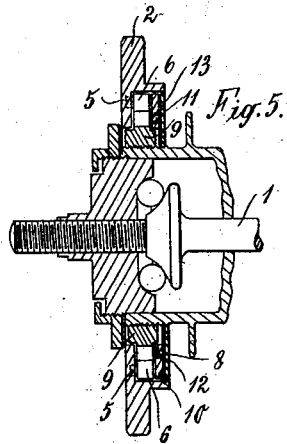
Witnesses
Inventor No. 756,086. Patented March 29, 1904.

UNITED STATES PATENT OFFICE.

JOHANN JAKOB WEILER, OF MÖRCHINGEN, GERMANY.

INDEPENDENTLY-ROTATING WHEEL.

SPECIFICATION forming part of Letters Patent No. 756,086, dated March 29, 1904.

Application filed November 7, 1902. Serial No. 130,401. (No model.)

*To all whom it may concern:*

Be it known that I, JOHANN JAKOB WEILER, watchmaker and goldsmith, a subject of the German Emperor, residing at 6 Marktplatz, in the city of Mörchingen, Lorraine, in the German Empire, have invented a certain new and useful Independently-Rotating Wheel, of which the following is a specification.

This invention has reference to an independently-rotating wheel in connection with cycles and the like, and it refers particularly to a novel construction of the driving-gear of the independently-rotating wheel.

The annexed drawings are illustrations of an embodiment of my invention.

In the drawings, Figure 1 is a top view. Fig. 2 is a side view. Fig. 3 is a rear view, the parts which cover the ratchet-wheel being removed. Fig. 4 is a detail of Fig. 2 in side view. Fig. 5 is a section on the line A B of Fig. 3. Fig. 6 is a side view, and Fig. 7 is a top view.

The driving-wheel is rotatably mounted upon the axle or shaft 1, and upon the hub of said wheel is freely rotatable the sprocket-wheel 2, provided with two holes 3 4. (See also Figs. 2 and 3.) In the hole 3 the pivot 5 of a dog 6 is rotatably mounted. (See also Figs. 6 and 7.) This dog is made integral with a ratchet-pawl 7, to one side of which the stud 8 is fastened.

9 is a ratchet-wheel, Figs. 2, 3, and 5, connected to the wheel-hub and which is countersunk in the sprocket-wheel and upon which the ratchet-pawl 7 is free to move along.

Another dog, corresponding entirely to the part 6, may be rotatably journaled in the opening 4 of the sprocket-wheel.

10 is a disk (see also Fig. 4) which is frictionally and rotatably journaled upon the hub of the ratchet-wheel 9, as is clearly shown in Fig. 5 of the drawings. This disk is provided with two inclined slots 11 12, with which the guide-pin or stud 8 of the dog 6 engages. Behind the disk 10 I provide a protecting-disk 13, rigidly connected with the hub of the driving-wheel, Fig. 5. This disk with a ring-shaped projection of the opposite surface of the sprocket-wheel *g* constitutes a casing which incloses the operating means of the driving-gear, and thereby prevents the entrance of dust between these parts. In previous constructions of the so-called "free-wheel-type" cycles, where the movement was transmitted from the freely-rotatable sprocket-wheel upon the driving-wheel by means of dogs, these parts were unprotected and were therefore open to rapid wearing and destruction of the delicate engaging parts, which is avoided by the provision of the protecting-disk 13 referred to.

The operation of the device is as follows: When the sprocket-wheel is rotating in the forward direction, it is running ahead of the disk 10, which is journaled with greater friction. Now inasmuch as the pins 8 are sliding in the slots 11 12 the ratchet-pawls 7 are guided so as to assume the position behind one tooth each, respectively, of the ratchet-wheel 9, as shown in Fig. 2 of the drawings, so that when the sprocket-wheel 2 is moving in the forward direction the ratchet-wheel 9, and consequently also the driving-wheel, are made to rotate in the forward direction. If, however, the pedals, and consequently also the sprocket-wheel, are stopped, or upon the backward rotation of the latter, the ratchet-pawls 7 are disengaged from the ratchet-wheel 9 or lifted, respectively, by the continued rotation of the parts 9 10, which is effected for the part 9 by the action of the back parts of the ratchet-teeth, and as regards the latter, the part 10, by the pins 8 moving up the inclined slots 11 12, which causes the ratchet-wheel 9 and the driving-wheel to continue their rotation unimpeded.

What I claim, and desire to secure by Letters Patent of the United States, is—

In a free-wheel cycle-driving mechanism the combination with a pawl-actuated driving-wheel and a freely-rotatable pawl-bearing sprocket-wheel at one side and a freely-rotatable pawl-guiding disk at the other side of the driving-wheel, of an annular rim, surrounding the driving-wheel and disk and attached to one surface of the said sprocket-wheel and a protecting-cover disk rigidly secured on the wheel-hub and registering with the said rim, so as to incase and protect the driving mechanism, substantially as described.

In witness whereof I have hereunto set my hand in presence of two witnesses.

JOHANN JAKOB WEILER.

Witnesses:
 M. L. BRITTAIN,
 EMIL FRANK.